United States Patent [19]

Redwine

[11] 3,783,418

[45] Jan. 1, 1974

[54] CRYSTAL FILTERING DEVICE

[75] Inventor: Clyde S. Redwine, Longwood, Fla.

[73] Assignee: Johnson Electronics, Inc., Casselberry, Fla.

[22] Filed: Jan. 4, 1973

[21] Appl. No.: 320,849

[52] U.S. Cl. .................................. 333/72, 333/70 S

[51] Int. Cl. ........ H03h 7/08, H03h 7/10, H03h 9/00

[58] Field of Search ....................... 333/72; 330/174; 317/101 B, 101 C

[56] References Cited

UNITED STATES PATENTS

| | | | |
|---|---|---|---|
| 2,266,658 | 12/1941 | Robinson | 333/72 |
| 2,296,882 | 9/1942 | Toth | 330/167 X |
| 1,848,912 | 3/1932 | Taylor et al. | 330/167 X |
| 2,097,458 | 11/1937 | Hansell | 333/72 |
| 3,206,692 | 9/1965 | Fogle et al. | 333/72 X |

*Primary Examiner*—Rudolph V. Rolinec
*Assistant Examiner*—Marvin Nussbaum
*Attorney*—Birch & Birch

[57] ABSTRACT

An IF crystal filter for frequency modulation receivers of the SCA (Subsidiary Communication Authorization) type, which receive signals utilizing relatively high modulating frequency subcarriers, is provided which includes, on a single circuit card, a phase splitter across its input terminals providing first and second signals of equal amplitude and opposite phase to an output resonant circuit tuned to a given center frequency through first and second resonant crystals, respectively, one resonant above and one resonant below that center frequency in equal amounts.

4 Claims, 2 Drawing Figures

CRYSTAL FILTERING DEVICE

This invention relates to crystal filter assemblies and more particularly for IF filter assemblies for receivers in frequency modulation systems of the SCA type utilizing relatively high modulating frequency subcarriers.

Frequency modulation produces an infinite series of sideband frequency pairs about the center frequency of the carrier. The number of significant pairs (those with an amplitude of at least one percent of the unmodulated carrier) depends upon the ratio of the maximum signal deviation to the highest modulating frequency.

Thus, the higher the modulating frequency the greater the bandwidth required to pass all significant sidebands.

For broadcast band FM monophonic transmission, for example, a receiver bandwidth of 210KHZ is generally accepted as sufficient to pass all significant sidebands.

In systems utilizing the higher modulating frequencies of SCA sub-carriers, however, there are more stringent requirements imposed on the phase and amplitude response characteristics of FM receivers than are encountered with normal monophonic and stereophonic FM broadcasting.

In the past, double tuned IF transformers with coupling factors near unity have been used to provide the required IF input selectivity for such receivers.

Tuned IF amplifiers, used in conjunction with such IF circuits exhibit a frequency dependent phase shift between the secondary current of the transformer at resonance and the secondary current at frequences off resonance.

At resonance, the secondary current is in phase with the secondary voltage. Above resonance, the tuned secondary of the transformer is capacitive, causing the secondary current to lead the secondary voltage; and the above-resonance secondary current has a leading phase angle with respect to the secondary current at resonance. Conversely, at frequencies below resonance, the below-resonance secondary current lags with respect to the secondary current at resonance.

Accordingly, if these phase relationships do not vary linearly with frequency within the IF passband, the use of high frequency SCA sub-carriers results in time-delay distortion of the IF signal and crosstalk.

In the past IF stages have used a plurality of amplifiers and IF filters (the double tuned transformers previously described) to achieve the necessary gain in the IF stage of the receiver. Advances in the semiconductor art, however, have made available devices with sufficient gain to provide an entire IF amplifier in one envelope.

Thus, the problem has arisen in the art to provide lumped IF filters compatible with such single envelope IF amplifiers. Also, to attain the proper bandwidth, high rate of cut-off with a limited number of poles and high unloaded Q, ordinary L-C resonators are not practical and quartz crystal filters have been found to be both practical and more desirable.

It is, therefore, an object of the present invention to provide a new and novel quartz crystal IF filter for FM receivers.

Another object of the present invention is to provide a new and novel quartz crystal IF filter for FM receivers which exhibits a maximally linear phase response to input signals.

Still another object of the present invention is to provide a new and novel quartz crystal IF filter for FM receivers which exhibits minimal passband ripple.

Yet another object of the present invention is to provide a new and novel quartz crystal IF filter circuit and structure for use in FM receivers and the like.

These and other objects of the present invention will become more fully apparent with reference to the following specification and drawings which relate to a preferred embodiment thereof:

Basically, the crystal filter includes a phase splitter across its input terminals which provides first and second equal amplitude, opposite phase signals coupled, respectively, to an output resonant circuit through first and second series resonant crystals. The first and second crystals are resonant, respectively, above and below the center frequency in equal amounts.

The signals are then combined in an output resonant circuit which is tuned to the center frequency.

The output of the filter is coupled to the load through suitable impedance matching means.

The crystal filter is all contained on a single circuit board for direct mounting as a modular unit onto the mother board in the IF stage of a receiver. A wire lead of one of the resonant crystals is formed in a predetermined configuration across that crystal and a portion of the circuit board to compensate for stray capacitance within the circuit assembly and to optimize skirt selectivity.

Figure 1:
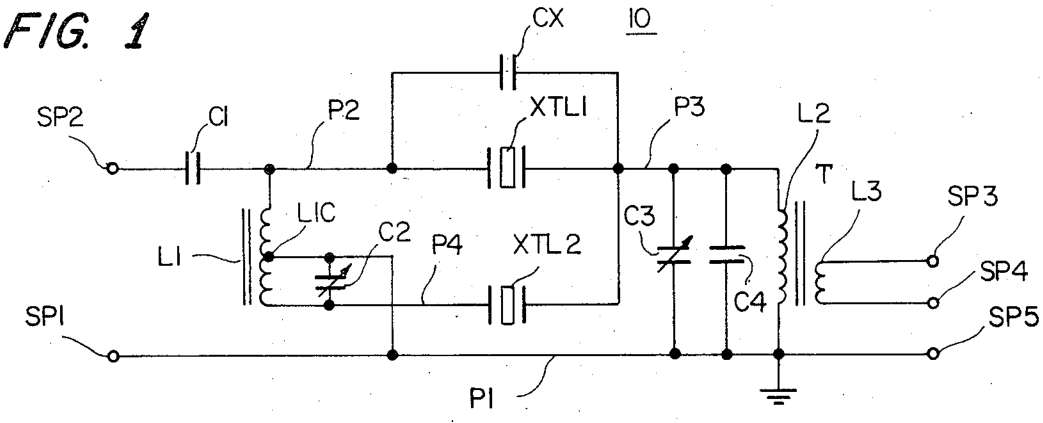
FIG. 1 is a circuit diagram of the filter of the present invention.

Referring in detail to the drawings and first, with specific reference to FIG. 1, the crystal filter circuit 10 of the present invention is shown as including a common input-output lead P1 having an input terminal SP1 at one end and a grounded output terminal SP5 at the other.

Second input terminal SP2 is provided which is directly connected to one side of an input coupling capacitor C1, the other side of the latter being commonly connected to one side of a first series resonant crystal XTL1 and one side of a "gimmick" capacitor CX which compensates for stray capacitance in the filter circuit 10, this common connection comprising an input circuit node P2.

The other sides of the first crystal XTL1 and gimmick capacitor CX are commonly connected to an output circuit node P3.

From the input circuit node P2, there is connected one end of a bifilar wound center tapped toroidal input inductance L1 which is used as a phase splitter for the incoming signal at the input terminals SP1, SP2.

The center tap L1C of the input inductance L1 is connected directly to the common or ground lead P1 of the filter 10 and through a variable capacitance C2 to the opposite end of the input inductance L1, the latter being connected to a second input circuit node P4. The input mode P4, and hence, the said opposite end of the input inductance L1 are directly connected to one side of a second series resonant crystal XTL2, the opposite side of the latter being directly connected to the output node P3.

From the output node P3 to the common or ground lead P1 are connected, in parallel, a variable output tuning capacitor C3, a fixed output capacitor C4 and an output inductance L2. These capacitors are for the purpose of resonating the output inductance L2 to center frequency.

The output inductance L2 is the primary winding of a transformer T having an isolated secondary winding L3 which carries output terminals SP3 and SP4 at respective ends thereof to complete the crystal filter circuit 10.

The filter circuit, via the isolated secondary winding L3, is thus adapted to be coupled with a load across the output terminal SP3, SP4 by mutual inductance.

The effective turns ratio of the output transformer T is such that it transforms a low impedance load to the value required to produce the desired primary resistance of the output transformer T.

The first resonant crystal XTL1 is the high side crystal (resonant above center frequency).

The second resonant crystal XTL2 is the low side crystal (resonant below center frequency).

Figure 2:
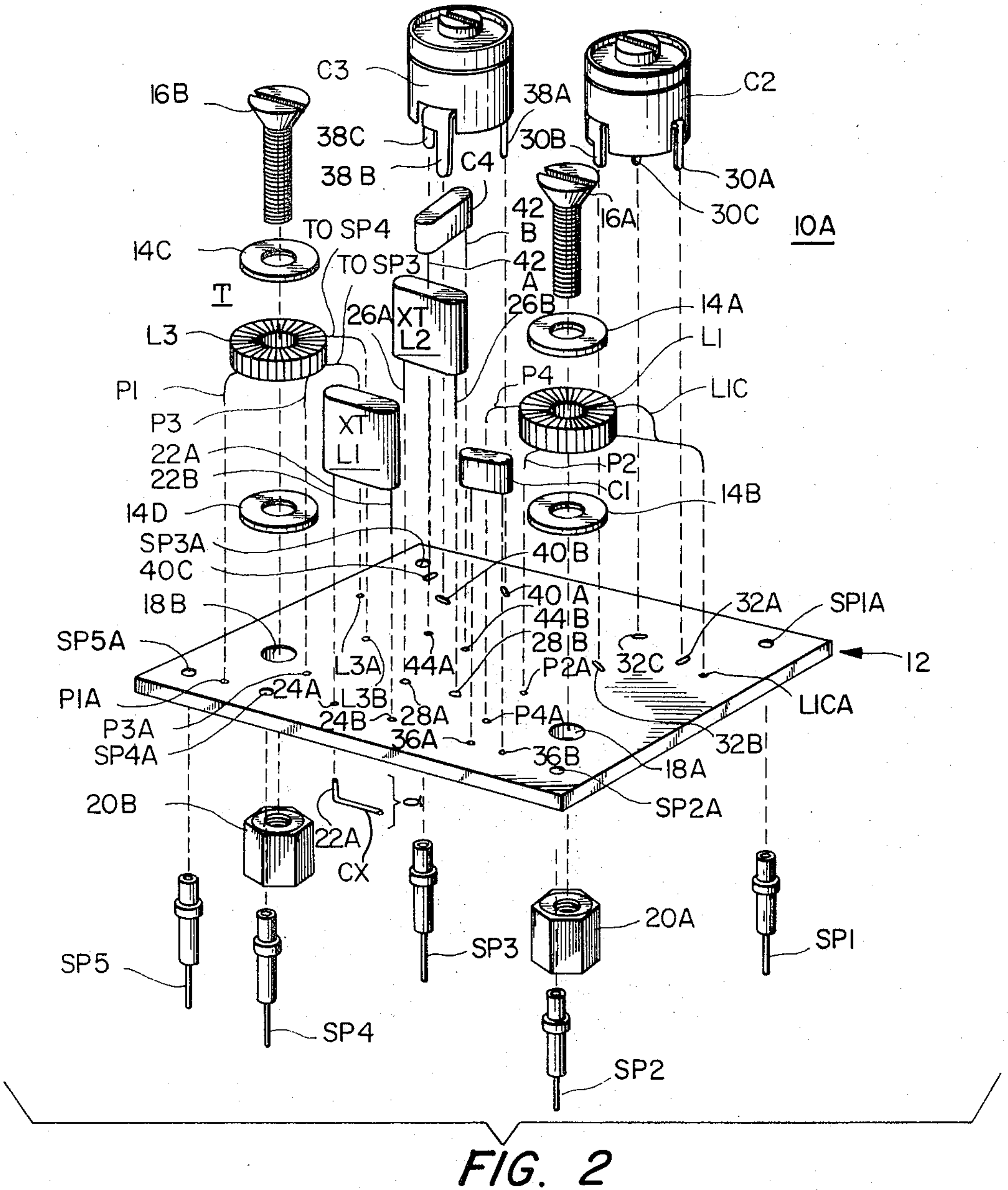
FIG. 2 is an exploded view of the physical structure of the filter of the present invention.

Referring now to FIG. 2, a preferred physical embodiment 10A of the crystal filter circuit 10 is shown as including a low loss printed wiring board 12 which provides a means to orient and interconnect all of the electrical components of the present invention as well as provide a rigid mechanical support for same.

The toroidal input inductance L1 is mounted in one corner of the circuit board 12 by sandwiching it between a pair of substantially coterminate non-metallic washers 14A and 14B, the latter juxtaposed with the upper surface of the board 12 and the entire sandwiched assembly held in place by a non-metallic screw 16A extending downward through a part 18A in the board 12 and thereafter secured to the said board 12 by a non-metallic hex nut 20A or other suitable hold-down means.

The toroidal output transformer T, comprising the output inductance windings L2 and L3, is mounted on an adjacent corner of the rectangular board 12 in like manner by a pair of non-metallic washers 14C, 14D, non-metallic screw 16B, port 18B and non-metallic hex nut 20B or other suitable hold-down means, with the washer 14D being juxtaposed with the upper surface of the circuit board 12.

The high side crystal XTL1 is mounted through the circuit board 12 by a pair of dependent wire leads 22A, 22B, the former lead 22A being deformed beneath the board 12 in a substantially right angle bend and extending beneath the crystal XTL1 along major axis of the latter. The wire leads 22A, 22B extend, respectively, through ports 24A, 24B in the board 12 adjacent that edge of the board mutually outboard of the screw ports 18A and 18B.

The low side crystal XTL2 is mounted adjacent the high side crystal XTL1, inboard of the screw ports 18A, 18B and with the major axes of the crystals substantially parallel, by wire leads 26A, 26B cooperating with ports 28A, 28B, respectively, in the board 12.

The variable capacitor C2 for resonating the input inductance L1 is mounted in the board 12 by three prongs 30A, 30B and 30C cooperating with ports or sockets 32A, 32B and 32C, respectively, located in the corner of the board 12 diagonally opposite to the output transformer T and adjacent the input inductance L1.

The coupling capacitor C1 is mounted in line with the high side crystal XTL1, adjacent the input inductance L1 and with its major axis substantially aligned with that of the said crystal XTL1, by means of wire leads 34A, 34B extending through ports 36A, 36B, respectively, in the board 12.

The variable output tuning capacitor C3 for resonating the output inductance L2 is mounted in the board 12 by three prongs 38A, 38B and 38C cooperating with ports or sockets 40A, 40B and 40C, respectively, located in the corner of the board adjacent the output tranformer T and diagonally opposite the input inductance L1.

The fixed output tuning capacitor C4 is mounted inboard of and mutually adjacent the output transformer T and variable output tuning capacitor C3 with its major axis substantially perpendicular to that of the fixed input coupling capacitance C1 by means of a pair of wire leads 42A, 42B cooperating with a pair of ports 44A, 44B, respectively, in the board 12.

The leads on the input inductance L1 and output inductance L2 corresponding to the common lead P1 and nodes P2, P3 and P4 are connected through ports P1A, P2A, P3A and P4A, respectively in the circuit board 12 adjacent the respective inductive components.

The secondary winding L3 is connected to the output terminals SP3 and SP4 by wire leads extending through ports L3A and L3B in the board 12 adjacent to output transformer T.

The center tap L1C on the input inductance L1 is connected to the common lead P1 through a port L1CA in the board 12 adjacent the said input inductance.

All of the circuit wiring and connections are effected by suitable printed circuit paths on the underside of the board 12.

The input terminals SP1 and SP2 comprise downwardly extending shoulder pins mounted through ports SP1A and SP2A, respectively, in those corners of the board 12 adjacent the variable input capacitor C2 and the input inductance L1, respectively.

The output terminals SP3 and SP5 comprise downwardly extending shoulder pins, mounted through ports SP3A and SP5A, respectively, in those corners of the board 12 adjacent the variable output capacitor C3 and the output transformer T, respectively.

The output terminal SP4 comprises a downwardly extending shoulder pin mounted in a port SP4A in the board 12 adjacent the output transformer T and substantially in line with the ports SP5A and SP2A.

The shoulder pins SP1–SP5, which bear the same respective numerals as the terminals SP1–SP5 which they comprise, provide a connector array by whichh the entire filter assembly 10A can be connected to a mother circuit board in the IF stage of an FM receiver.

Thus, there is provided a single crystal filter module for the entire IF stage of such a receiver.

OPERATION

Referring to both FIGS. 1 and 2, if a frequency modulated input signal is applied to the input terminals SP1 and SP2 of the filter circuit 10 (assembly 10A), with the variable input capacitance C2 adjusted to resonate the input inductance L1 to a desired center frequency, there result two output signals, one across the high side crystal XTL1 and output inductance L2 and one across the low side crystal XTL2 and output inductance L2 which are, substantially, exactly equal in amplitude and opposite in phase.

With the output inductance L2 resonated to the desired center frequency and the high and low side resonant frequencies of the crystals XTL1 and XTL2, respectively, being in equal but sufficient deviation from center frequency to include all of the significant sidebands, the signals mixed in the output inductance L2 show a substantially linear phase variation over the IF passband to which the filter circuit 10 (assembly 10A) is tuned.

I claim:

1. As an article of manufacture, a passband IF crystal filter for FM receivers in the configuration of a plug-in module, comprising:

a rectangular printed circuit board having circuit connections printed on one side thereof and a plurality of ports extending through said board at each point where component connections are located;

a bifilar wound toroidal input coil mounted on said board in one corner thereof;

an output toroidal transformer mounted on said board in a second adjacent corner thereof;

a variable input tuning capacitor mounted on said board in a third corner thereof adjacent said input coil and diagonally opposite said output transformer;

a variable output tuning capacitor mounted on said board in a fourth corner thereof adjacent said output transformer and diagonally opposite said input coil;

elongated first and second resonant crystal means each having a major axis substantially mutually parallel and mounted on said board intermediate said input coil and said output transformer with said axes substantially parallel with the side of said board extending between said first and second corners;

an elongated input coupling capacitor having mounted adjacent said first crystal means and having a major axis substantially aligned with that of said first crystal means;

an elongated output range capacitor mounted on said board adjacent said second crystal means and having a major axis substantially perpendicular to that of said second crystal means; and input and output terminal means comprising shoulder pins mounted one dependent from each of said corners and one dependent from said board edge between said first and second corners between said output transformer and said first crystal means.

2. As an article of manufacture, a passband IF crystal filter for FM receivers in the configuration of a plug-in module, as defined in claim 1, wherein said toroidal input coil and said toroidal output transformer are each sandwiched between non-metallic washer means and each are maintained on said board by non-metallic hold-down screw means extending through said washers said toroids and said board into engagement with non-metallic nut means at the said one side of said board.

3. As an article of manufacture, a passband IF crystal filter for FM receivers in the configuration of a plug-in module, as defined in claim 1, wherein said first crystal means includes first and second wire leads extending through said ports in said board, one of said leads being elongated and deformed to extend beneath said board along to major axis of said first crystal means in the provision of a compensating capacitor for said plug-in module.

4. As an article of manufacture, a passband IF crystal filter for FM receivers in the configuration of a plug-in module, as defined in claim 1, wherein said toroidal input coil and said toroidal output transformer are each sandwiched between non-metallic washer means and each are maintained on said board by non-metallic hold-down screw means extending through said washers said toroids and said board into engagement with non-metallic nut means at the said one side of said board; and wherein said first crystal means includes first and second wire leads extending through said ports in said board, one of said leads being elongated and deformed to extend beneath said board along to major axis of said first crystal means in the provision of a compensating capacitor for said plug-in module.

* * * * *